April 15, 1930.  R. G. CLYNE  1,754,611
POCKET CHECK PROTECTOR
Filed Sept. 24, 1928
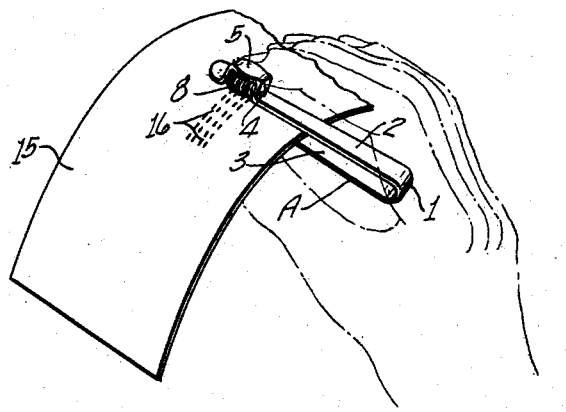
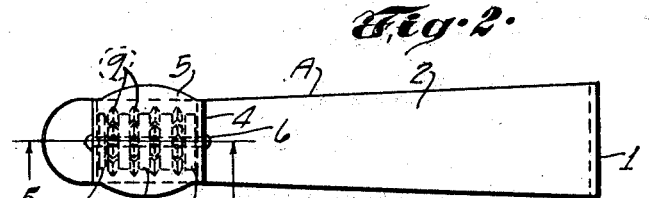
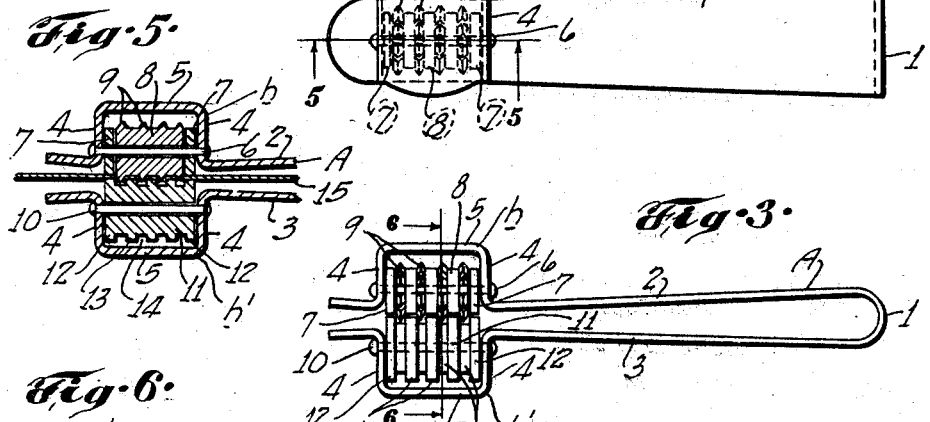
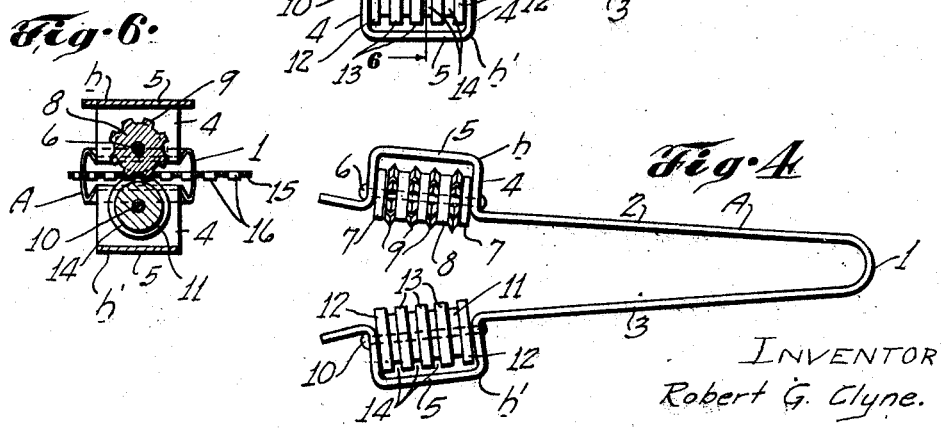
INVENTOR
Robert G. Clyne.
ATTORNEY Patented Apr. 15, 1930

1,754,611

UNITED STATES PATENT OFFICE

ROBERT G. CLYNE, OF ST. LOUIS, MISSOURI; MERCANTILE-COMMERCE BANK AND TRUST COMPANY OF ST. LOUIS, ADMINISTRATOR OF SAID ROBERT G. CLYNE, DECEASED, ASSIGNOR TO CLYNE ENGINEERING COMPANY, OF ST. LOUIS, MISSOURI, A CORPORATION OF MISSOURI

POCKET CHECK PROTECTOR

Application filed September 24, 1928. Serial No. 308,108.

This invention relates to a certain new and useful improvement in pocket check-protectors of the type that includes a toothed "cutting" roller.

So far as I am aware, devices of such type have heretofore neither been efficient nor successful. This has been due largely to the fact that, in and by the engagement between the toothed or cutting roller and the check or other such paper, proper free rotary movement of such roller relatively to the check was prevented, with the result either that the attempted cutting was crude or faulty or the check torn or otherwise damaged.

My present invention has hence for its object the provision, as a new article of manufacture, of a device of the kind and for the purpose stated which is simple in form and durable and compact in structure, which may be economically manufactured, which is conveniently operable, and which is efficient in the performance of its intended functions.

And with the above and other objects in view, my invention resides in the novel features of form, construction, arrangement, and combination of parts hereinafter described and pointed out in the claims.

In the accompanying drawing,—

Figure 1 is a perspective view of a check-protector of my invention, illustrated as in a check-protecting operation;

Figure 2 is a plan view of the check-protector;

Figure 3 is a side elevational view of the check-protector, with its check-engageable members or rollers in aligning check-engaging relation;

Figure 4 is a similar view of the check protector, with its check-engageable rollers in spaced or spread-apart check-receiving relation;

Figure 5 is a fragmental longitudinal sectional view of the check-protector taken approximately on the line 5—5, Figure 2; and Figure 6 is a transverse sectional view of the check-protector taken approximately on the line 6—6, Figure 3.

Referring now more in detail and by reference characters to the drawing, which illustrates a preferred embodiment of my invention, the main or body-portion A of my new pocket check protector is substantially of U-shape and is constructed of a suitably elongated section or strip of preferably light spring steel or other suitable material, arcuately bent and doubled upon itself intermediate its ends, as at 1, to integrally comprise and provide a joined or connected pair of co-operating approximately parallel legs 2, 3, transversely yieldable relatively to each other.

Adjacent their free end, the legs 2, 3, are each bent and recessed to integrally include so-called box-like or rectangular casings $h$, $h'$, respectively, the end walls 4, 4, of each of which are presented outwardly approximately at right angles to, and the main wall 5 of each of which is approximately parallel with, the respective leg 2, 3.

As will be seen, the casings $h$, $h'$ are in opposed relation, and extending lengthwise of the leg 2 and having a bearing in the end-walls 4 of casing $h$, is a shaft 6. Journaled for rotation upon the shaft 6 and correspondingly housed within the casing $h$, is a pair of separate bearing-rollers 7, 7, each preferably smooth and uninterrupted upon its periphery. Also journaled for rotation upon the shaft 6 intermediate of, and independently rotatable relatively to, the rollers 7 and likewise correspondingly housed within the casing $h$, is a suitably elongated roller 8 provided or formed upon its periphery with preferably a series of suitably spaced circumferential rows of cutting teeth or the like 9.

Extending lengthwise of the leg 3 and having a bearing in the end-walls 4 of casing $h'$, is a similar shaft 10, journaled for rotation upon which and correspondingly housed in the casing $h'$ is preferably a single suitably elongated roller 11 whose periphery is formed to circumferentially include smooth ring-like end-surfaces 12, 12, and alternate intermediate smooth ring-like surfaces 13 and grooves 14, the rollers 7, 8, and 11 being so relatively disposed that the rollers 7 are adapted to co-operatively align with the end-rings 12 of roller 11 and the several rows of teeth 9 of roller 8 to co-operatively align with the several respective grooves 14 of roller 11.

As so constructed and disposed, and in protecting or "cutting" a check or other document or paper 16, the check 15 is inserted between the legs 2, 3, and by finger-pressure exerted upon the casing-walls 5, the several rollers brought together in operative check-engaging alignment or registration, as best seen in Figures 3, 5, and 6. In such engagement with the check 15, the interposed check is movably clamped or gripped, as it might be said, merely between the rollers 7 and the end-rings 12 of roller 11, upon which latter the rollers 7 have a rolling bearing only, the toothed roller 8 being free to rotate in performance of its "cutting" function, as the check 15 and the body A are relatively shifted. Such relative shifting of the check 15 and body A is, in turn, conveniently facilitated by merely the rolling engagement therewith of the rollers 7 and the end-rings 12 of the platen roller 11, and in such relative shifting of the body A and check 15, the roller 8 at its teeth 9, in co-operation with the rings 13 and grooves 14 of the platen-roller 11, efficiently functions to "cut", as at 16, and thereby "protect" the interposed check 15, tearing of or other such damage to the check being entirely obviated.

It is to be understood that changes in the form, construction, arrangement, and combination of the several parts of my new check-protector may be made and substituted for those herein shown, and described without departing from the nature and principle of my invention.

Having thus described my invention, what I claim and desire to secure by Letters Patent is:

1. In a pocket-check protector, as a new article of manuufactre, co-operating rollers for rollably engaging therebetween the check to be protected, and an independently rotatable toothed roller for cutting the so engaged check on relative movement of the check and protector.

2. In a pocket check-protector, as a new article of manufacture, co-operating rollers for rollably engaging therebetween the check to be protected, and an independently rotatable roller provided with a circumferential row of teeth for cutting the so engaged check on relative movement of the check and protector, one of said first rollers having a circumferential groove for check-cutting co-operation with the toothed roller.

3. In a pocket check-protector, as a new article of manufacture, co-operating rollers for rollably engaging therebetween the check to be protected, and an independently rotatable roller provided circumferentially with a series of spaced rows of teeth for cutting the so-engaged check on relative movement of the check and protector, one of said first rollers having a corresponding series of spaced circumferential grooves for check-cutting co-operation with the toothed roller.

4. In a pocket check-protector, as a new article of manufacture, a pair of bearing rollers, a platen roller, the bearing and platen rollers being adapted to co-operatively rollably engage therebetween the check to be protected, and an independently rotatable roller provided circumferentially with a series of spaced rows of teeth for cutting the so engaged check on relative movement of the check and protector, said platen roller having corresponding series of circumferential grooves and rings for cutting co-operation with the toothed roller.

5. In a pocket check-protector, as a new article of manufacture, a body-portion including co-operatively yielding first and second legs, a roller mounted for rotation upon one of said legs, said roller being circumferentially provided with a series of spaced rows of teeth, separate bearing rollers also mounted for rotation upon said first leg and disposed at opposite ends of the toothed roller, and a platen roller mounted for rotation upon the second leg, said platen roller being peripherally adapted for co-operation at its ends with the bearing rollers in rollably engaging therebetween the check to be protected and being provided intermediate its ends with alternate grooves and rings for co-operation with the toothed roller in check-cutting operations.

In testimony whereof, I have signed my name to this specification.

ROBERT G. CLYNE.